United States Patent
Price, Jr. et al.

(10) Patent No.: US 7,242,544 B2
(45) Date of Patent: Jul. 10, 2007

(54) APPARATUS AND METHOD FOR APPLYING WRITE SIGNALS FOR DRIVING A WRITE HEAD

(75) Inventors: John Joseph Price, Jr., Eagan, MN (US); Tuan Van Ngo, Eden Prairie, MN (US)

(73) Assignee: Texas Instruments Incorporated, Dallas, TX (US)

( * ) Notice: Subject to any disclaimer, the term of this patent is extended or adjusted under 35 U.S.C. 154(b) by 727 days.

(21) Appl. No.: 10/754,647

(22) Filed: Jan. 10, 2004

(65) Prior Publication Data

US 2005/0174673 A1 Aug. 11, 2005

(51) Int. Cl.
*G11B 5/09* (2006.01)
*G11B 15/12* (2006.01)
*G11B 5/02* (2006.01)

(52) U.S. Cl. .............................. 360/46; 360/68; 360/61

(58) Field of Classification Search .................... None
See application file for complete search history.

(56) References Cited

U.S. PATENT DOCUMENTS 6,512,645 B1 * 1/2003 Patti et al. .................... 360/46

* cited by examiner

*Primary Examiner*—Andrea Wellington
*Assistant Examiner*—Jason Olson
(74) *Attorney, Agent, or Firm*—Wade J. Brady, III; Frederick J. Telecky, Jr.

(57) ABSTRACT

An apparatus for applying write signals including a first write signal and a second write signal to write information to a memory device includes a current directing circuit receiving the write signals and directing a write current to establish a write voltage between first and second write loci in a first or second excursion toward a first or second polarity in response to the first or second write signal. The first and second write loci are coupled with supply locus via an adjacent first or second impedance unit and a first or second switching unit. The first and second switching units are controlled at first and second control loci by the first and second write signals. First and second boost systems are coupled with the first and second control loci for boosting the write voltage toward the first and second polarities during first and second excursions.

12 Claims, 7 Drawing Sheets

APPARATUS AND METHOD FOR APPLYING WRITE SIGNALS FOR DRIVING A WRITE HEAD

BACKGROUND OF THE INVENTION

The present invention is directed to apparatuses and methods for writing data or information to storage media via a write head, and especially to apparatuses and methods for effecting such data writing at high speeds.

Slow rising and falling write head current transitions result in transitions or excursions of signals used for writing data occupying longer time intervals than would be the case if rise times and fall times were steeper. If signal transitions or excursions occur more quickly, more data can be transferred in a given time interval than can be transferred when rise times and fall times are slower.

Signal boost circuitry is employed to introduce overshoot characteristics in a write signal to cause the signal to have a faster rise time and fall time than are exhibited without overshoot characteristics. Faster rising and falling result in transitions or excursions of write signals between signal maximum and minimum levels in shorter time intervals. Because signal transitions or excursions occur more quickly, more data can be transferred in a given time interval than can be transferred when rise times and fall times are slower.

Faster rising and falling of signals to a write head in a storage system is manifested in increased density of stored bits. Write systems therefore preferably provide current overshoot characteristics to aid in quickly reversing current direction through a write head to reverse flux direction intersected by the storage medium (e.g., a magnetic disk) for writing information to the storage medium (e.g., "1"s and "0"s). Providing current overshoot characteristics also sharpens transition edges, thereby permitting reliable increased density writing of information to the storage medium.

Today's data writing devices are increasingly designed for smaller products using lower voltages and consuming less power to improve portability of the products. There is a need for a system and method for applying write signals for driving a write head that uses low voltage and consumes low power while introducing overshoot characteristics in a write signal.

SUMMARY OF THE INVENTION

An apparatus for applying write signals including a first write signal and a second write signal to write information to a memory device includes a current directing circuit receiving the write signals and directing a write current to establish a write voltage between first and second write loci in a first or second excursion toward a first or second polarity in response to the first or second write signal. The first and second write loci are coupled with supply locus via an adjacent first or second impedance unit and a first or second switching unit. The first and second switching units are controlled at first and second control loci by the first and second write signals. First and second boost systems are coupled with the first and second control loci for boosting the write voltage toward the first and second polarities during first and second excursions.

A method for applying write signals for driving a write head to effect writing information to a memory device, the write signals including a first write signal and a second write signal, includes the steps of: (a) in no particular order: (1) providing a current directing circuit; the current directing circuit receiving the write signals and including a first write locus and a second write locus; the first write locus being coupled with a supply source via an adjacent first impedance unit and a first switching unit; the second write locus being coupled with the supply source via an adjacent second impedance unit and a second switching unit; the first switching unit being controlled at a first control locus by the first write signal; the second switching unit being controlled at a second control locus by the second write signal; (2) providing a first boost system coupled with the first control locus; and (3) providing a second boost system coupled with the second control locus; (b) operating the current directing circuit to direct a write current to establish a write voltage between the first write locus and the second write locus across the write head in a first excursion toward a first polarity in response to the first write signal and to direct the write current to establish the write voltage across the write head in a second excursion toward a second polarity substantially opposite the first polarity in response to the second write signal; (c) operating the first boost system to boost the write voltage toward the first polarity during the first excursion; and (d) operating the second boost system to boost the write voltage toward the second polarity during the second excursion.

It is, therefore, an object of the present invention to provide a system and method for applying write signals for driving a write head that uses low voltage and consumes low power while introducing overshoot characteristics in a write signal.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
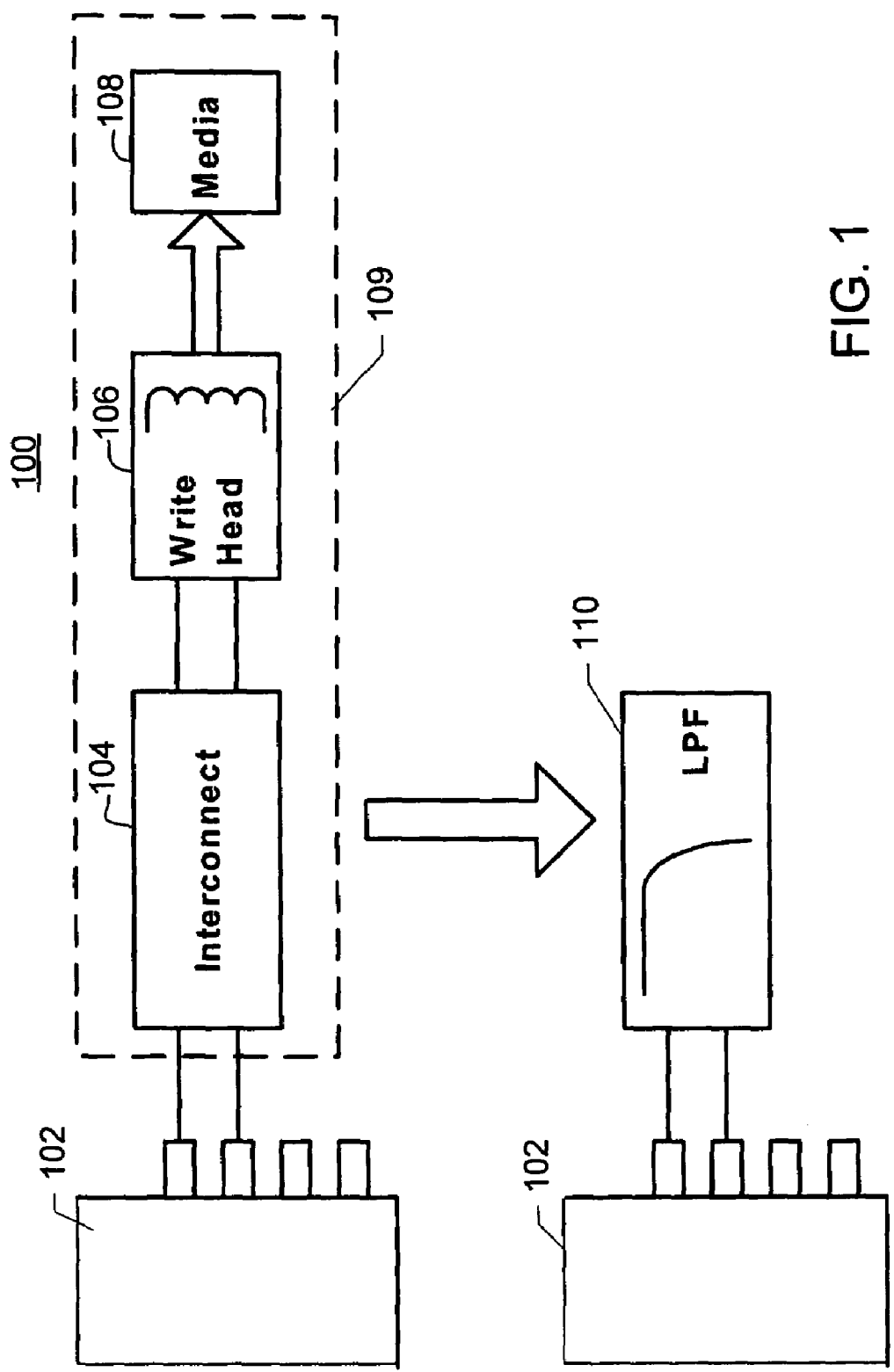
FIG. 1 is a schematic diagram illustrating modeling of a thin film inductive write driver system as a low pass filter.

FIG. 1 is a schematic diagram illustrating modeling of a thin film inductive write driver system as a low pass filter. In FIG. 1, a write driver system 100 includes a preamplifier 102 coupled with an interconnect structure 104. Interconnect structure 104 typically includes lead wires extending from preamplifier 102 along an extended arm reaching adjacent a magnetic storage disk (not shown in FIG. 1) to a write head 106. Write head 106 is typically suspended on the extended arm that supports interconnect structure 104 in close proximity with media 108. Media 108 is typically a magnetic storage disk.

Components contained within dotted line box 109 may be modeled as a low pass filter (LPF) 110 coupled with preamplifier 102. Low pass filter 110 is configured to pass signals having frequencies below a predetermined frequency value and inhibit passing of signals having frequencies above the predetermined frequency value. The output from low pass filter 110 is substantially manifested as the flux at write head 106.

Figure 2:
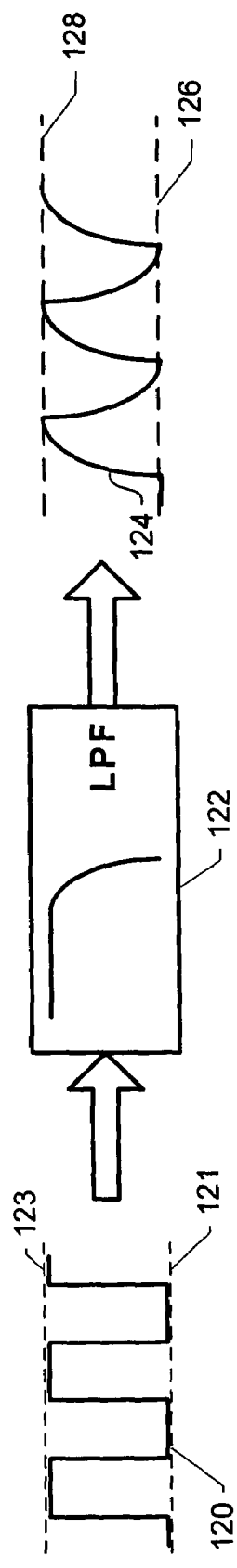
FIG. 2 is a schematic diagram illustrating how a low pass filter affects traversing signals.

FIG. 2 is a schematic diagram illustrating how a low pass filter affects traversing signals. In FIG. 2, an input signal 120 is input to a low pass filter 122. Input signal 120 varies between an input signal minimum 121 and an input signal maximum 123. Low pass filter 122 presents an output signal 124. Output signal 124 has a relatively slow rise time from output signal minimum 126 and output signal maximum 128. Similarly, output signal 124 has a relatively slow fall time from output signal maximum 128 to output signal minimum 126. Slow rising and falling result in transitions or excursions of output signal 124 between output signal minimum 126 and output signal maximum 128 occupying longer time intervals than would be the case if rise times and fall times were steeper. If signal transitions or excursions occurred more quickly, more data could be transferred in a given time interval than can be transferred when rise times and fall times are slower.

Figure 3:
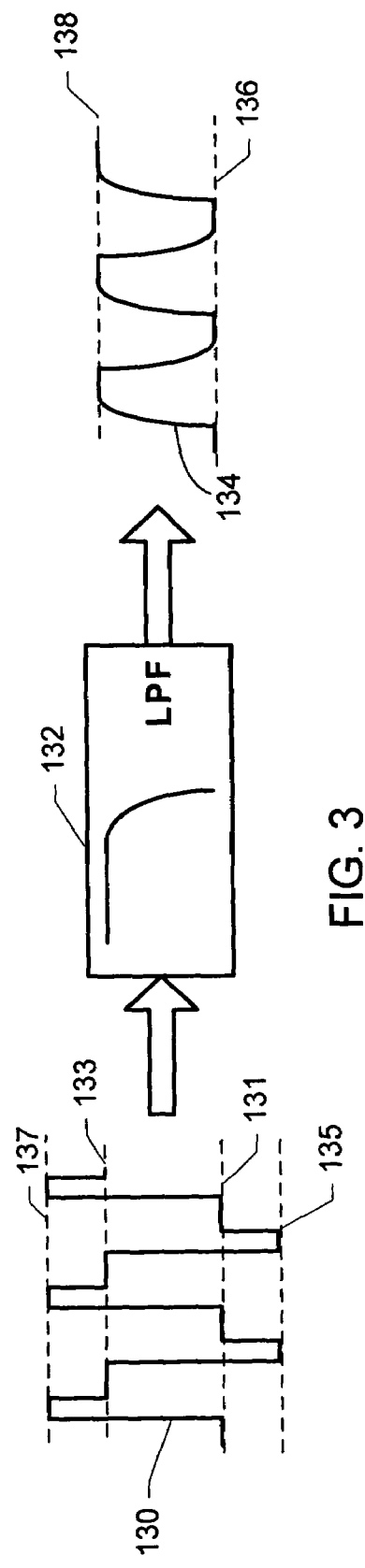
FIG. 3 is a schematic diagram illustrating how a signal overshoot affects the operation of a low pass filter.

FIG. 3 is a schematic diagram illustrating how a signal overshoot affects the operation of a low pass filter. In FIG. 3, an input signal 130 is input to a low pass filter 132. An overshoot characteristic is introduced to input signal 130 so that input signal 130 varies between an input signal minimum 135 and an input signal maximum 137. Input signal limits 135, 137 are beyond the nominal signal limits 131, 133 that would be associated with input signal 130 without an overshoot characteristic imposed. Low pass filter 132 presents an output signal 134. Output signal 134 has a relatively faster rise time (compared with rise time for output signal 124; FIG. 2) from output signal minimum 136 and output signal maximum 138. Similarly, output signal 134 has a relatively faster fall time (compared with rise time for output signal 124; FIG. 2) from output signal maximum 138 to output signal minimum 136. Faster rising and falling result in transitions or excursions of output signal 134 between output signal minimum 136 and output signal maximum 138 occupying shorter time intervals. Because signal transitions or excursions occur more quickly, more data can be transferred in a given time interval than can be transferred when rise times and fall times are slower.

Faster rising and falling of signals to a write head in a storage system is manifested in increased density of stored bits. Write systems therefore preferably provide current overshoot characteristics to aid in quickly reversing current direction through a write head to reverse flux direction intersected by the storage medium (e.g., a magnetic disk) for writing information to the storage medium (e.g., "1"s and "0"s). Providing current overshoot characteristics also sharpens transition edges, thereby permitting reliable increased density writing of information to the storage medium.

Figure 4:
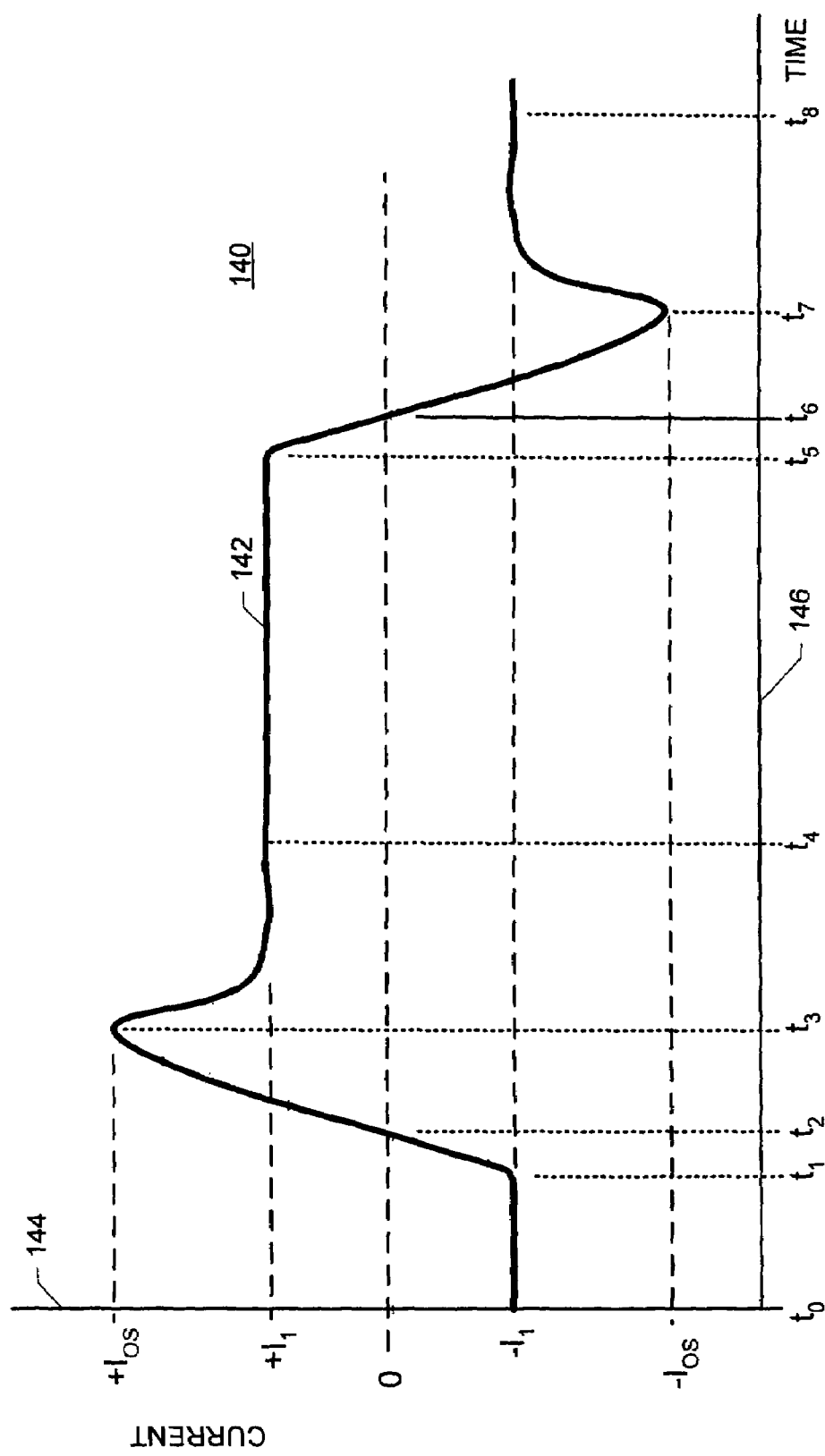
FIG. 4 is a graphic plot illustrating a desired write current waveform as a function of time.

FIG. 4 is a graphic plot illustrating a desired write current waveform as a function of time. In FIG. 4, a graphic plot 140 presents a curve 142 representing current through a write head is plotted according to a first (current) axis 144 as a function of time according to a second axis 146. Curve 142 begins at a time $t_0$ at a current level of $-I_1$. Current level $-I_1$ is a current level that indicates a digital character (e.g., a "1" or a "0") for storage in a medium such as a magnetic storage disk (not shown in FIG. 4). At a time $t_1$ curve 142 increases and passes zero at a time $t_2$. Curve 142 continues to increase until it reaches a value of $+I_{OS}$ at a time $t_3$. Current level $+I_{OS}$ is the positive overshoot current limit or peak overshoot of curve 142. Curve 142 rapidly declines in value after time $t_3$ and approaches a current level $+I_1$. Curve 142 settles out at current level $+I_1$ substantially at time $t_4$. Current level $+I_1$ is a current level that indicates a digital character (e.g., a "1" or a "0") for storage in a medium such as a magnetic storage disk (not shown in FIG. 4). At time $t_5$ curve 142 decreases and passes zero at a time $t_6$. Curve 142 continues to decrease until it reaches a value of $-I_{OS}$ at a time $t_7$. Current level $-I_{OS}$ is the negative overshoot current limit or peak undershoot of curve 142. Curve 142 rapidly increases in value after time $t_7$ and approaches a current level $-I_1$. Curve 142 settles out at current level $-I_1$ substantially at time $t_8$. Preferably curve is symmetrical so that there is no net positive or negative current. That is, preferably magnitude $|+I_{OS}|$ is equal with magnitude $|-I_{OS}|$, and interval $(t_1-t_4)$ is equal with interval $(t_5-t_8)$.

Figure 5:
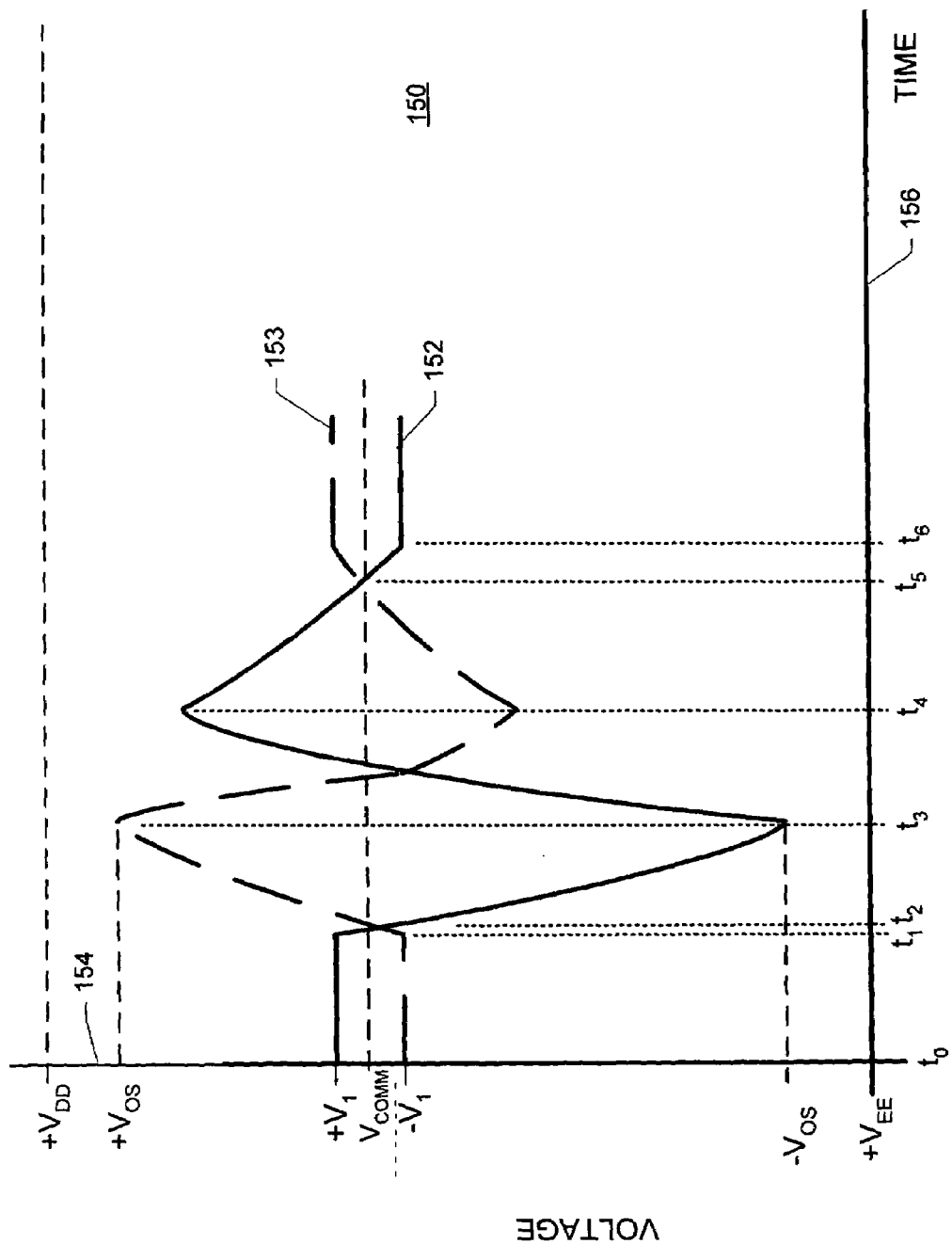
FIG. 5 is a graphic plot illustrating voltage characteristics across a write head as a function of time that are appropriate for presenting the desired current waveform illustrated in FIG. 4.

FIG. 5 is a graphic plot illustrating voltage characteristics across a write head as a function of time that are appropriate for presenting the desired current waveform illustrated in FIG. 4. In FIG. 5, a graphic plot 150 presents curves 152, 153 representing voltages present at respective connection terminals of a write head that provide the desired write currents (e.g., curve 142; FIG. 4). Curves 152, 153 are plotted according to a first (voltage) axis 154 as a function of time according to a second axis 156. Curve 152 represents voltage present at a first terminal of a write head and begins at a time to at a voltage level of $+V_1$. Curve 153 represents voltage present at a second terminal of the write head and begins at a time $t_0$ at a voltage level of $-V_1$. Curves 152, 153 represent voltage potentials at each of two ends of a write head that cooperate to establish a current through the write head (e.g., curve 142; FIG. 4). At a time $t_1$ curve 152 decreases and passes zero at a time $t_2$. At a time $t_1$ curve 153 increases and passes zero at time $t_2$. Polarity of the current through the write head is determined by polarities of voltages at terminals of the write head. Thus, current through the write head will proceed in a first direction (i.e., have a first polarity) when curve 152 is at potential $+V_1$ and curve 153 is at potential $-V_1$ as during the interval $t_0-t_2$. The relative polarities of curves 152, 153 during interval $t_0-t_2$ will produce a write current, for example, of $-I_1$ as indicated during interval $t_0-t_1$ in FIG. 4.

Curve 152 continues to decrease until it reaches a value of $-V_{OS}$ at a time $t_3$. Curve 153 continues to increase until it reaches a value of $+V_{OS}$ at time $t_3$. Voltage level $-V_{OS}$ is the negative overshoot voltage limit of curve 152. Voltage level $+V_{OS}$ is the positive overshoot voltage limit of curve 153. During the interval $t_2-t_3$ current (e.g., curve 142; FIG. 4) through the write head approaches zero and reaches zero at time $t_3$. Curve 152 rapidly increases in value after time $t_3$ and reaches a maximum excursion locus at time $t_4$. Curve 153 decreases in value after time $t_3$ and reaches a minimum excursion locus at time $t_4$. Current through the write head has passed its peak overshoot current limit (either $+I_{OS}$ or $-I_{OS}$, depending upon the relative polarities of curves 152, 153) during the interval $t_3-t_4$.

Curve 152 decreases after time $t_4$ and settles out at voltage $-V_1$ at time $t_6$. Curve 153 increases after time $t_4$ and settles out at voltage $+V_1$ at time $t_6$. Peak undershoot of current through the write head occurs at time $t_5$ when curves 152, 153 cross. Current through the write head during interval $t_0$–$t_1$ flows in the opposite direction of current through the write head following time $t_6$ because the relative polarities of curves 152, 153 are reversed during those times.

Figure 6:
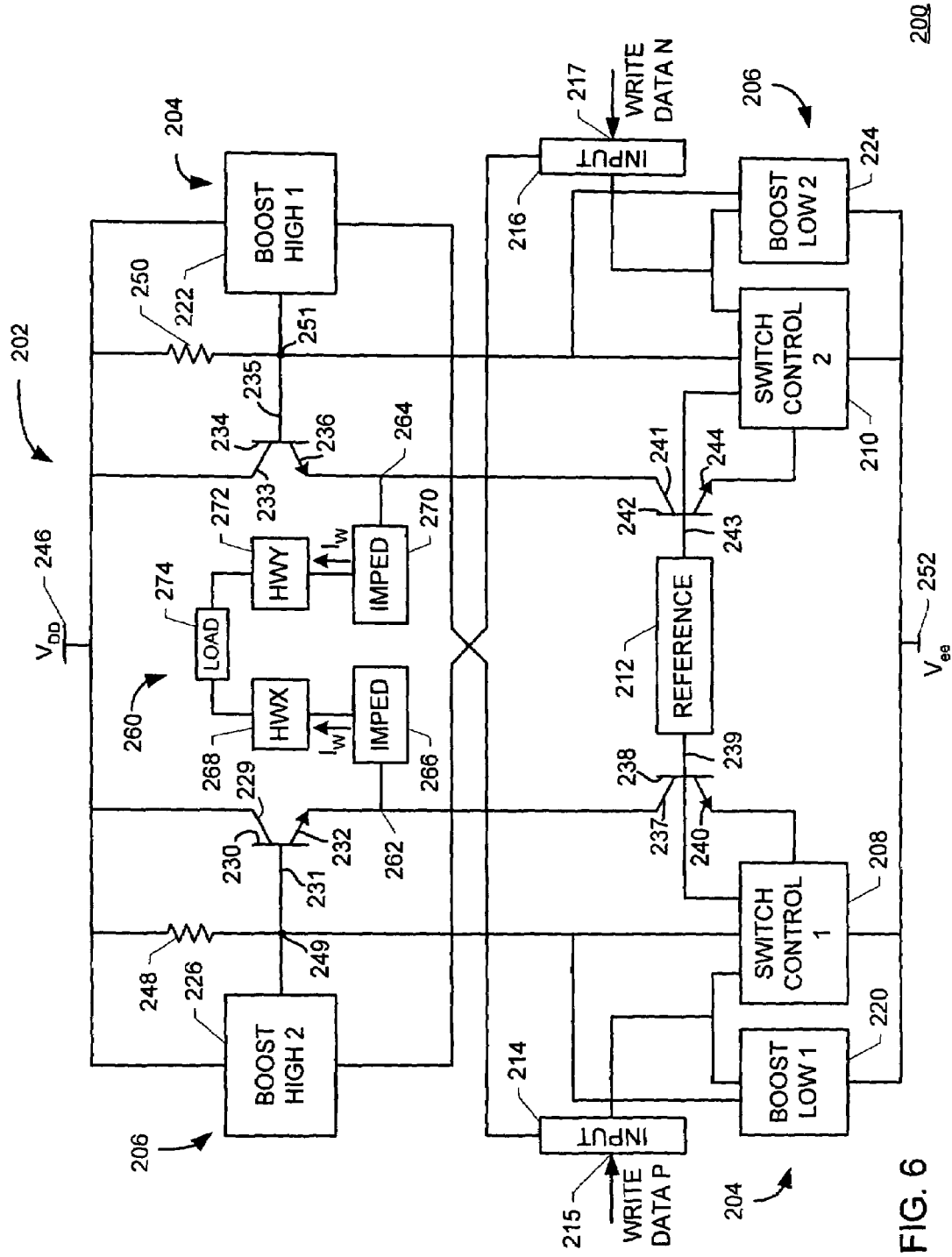
FIG. 6 is a simplified schematic diagram illustrating the apparatus of the present invention.

FIG. 6 is a simplified schematic diagram illustrating the apparatus of the present invention. In FIG. 6, a preamplifier apparatus 200 includes a current directing circuit or H-bridge circuit 202, a first boost system 204, a second boost system 206, a first switch control system 208, a second switch control system 210, a reference system 212 and input units 214, 216. First boost system 204 includes a first boost low unit 220 and a first boost high unit 222. Second boost system 206 includes a second boost low unit 224 and a second boost high unit 226.

H-bridge circuit 202 includes switching units embodied in bipolar transistors 230, 234, 238, 242. Transistor 230 has a collector 229, a base 231 and an emitter 232. Transistor 232 has a collector 231, a base 233 and an emitter 234. Transistor 238 has a collector 237, a base 239 and an emitter 240. Transistor 242 has a collector 241, a base 243 and an emitter 244. Collectors 229, 233 are coupled with a supply voltage locus 246 at which a supply voltage $V_{DD}$ is provided. Preferably supply voltage $V_{DD}$ is +5 volts. Emitter 232 is coupled with collector 237. Emitter 236 is coupled with collector 241. Base 231 is coupled with supply voltage locus 246 via a resistor 248, is coupled with second boost high unit 226, is coupled with first boost low unit 220 and is coupled with first switch control system 208. Base 235 is coupled with supply voltage locus 246 via a resistor 250, is coupled with first boost high unit 222, is coupled with second boost low unit 224 and is coupled with second switch control system 210. Base 239 is coupled with first switch control system 208 and with reference system 212. Base 243 is coupled with second switch control system 210 and with reference system 212. Emitter 240 is coupled with first switch control system 208. Emitter 244 is coupled with second switch control system 210. First boost low unit 220, first switch control system 208, second switch control system 210 and second boost low unit 224 are coupled with a voltage supply locus 252 at which a supply voltage $V_{ee}$ is provided.

Input unit 214 receives an input signal WRITE DATA P at an input locus 215. Input unit 214 is coupled with first switch control system 208, first boost low unit 220 and first boost high unit 222. Input unit 216 receives an input signal WRITE DATA N at an input locus 217. Input unit 216 is coupled with second switch control system 210, second boost low unit 224 and second boost high unit 226.

H-bridge circuit 202 further includes a data write system 260 coupled with a first connection locus 262 and a second connection locus 264. First connection locus 262 is located between and commonly connected with emitter 232 and collector 237. Second connection locus 264 is located between and commonly connected with emitter 236 and collector 241. Data write system 260 includes a first impedance matching unit 266 coupled with a first HWX write head port 268 and connection locus 262, and a second impedance matching unit 270 coupled with a second HWY write head port 272 and connection locus 264. A load 274 is coupled between HWX write head port 268 and HWY write head port 272. Load 274 is preferably embodied in a thin film transducer coupled with write head ports 268, 272 through a flex connection. Impedance matching units 266, 270 are used to match the impedance of the flex connection and preferably include capacitors (not shown in FIG. 6) to behave as a short at high frequencies in order to speed up transient current and voltage at write head ports 268, 272.

In operation, apparatus 200 receives input signal WRITE DATA P at input locus 215 and receives input signal WRITE DATA N at input locus 217. Preferably, input signals are operated from an internal +2 volts internal reference (in reference system 212; not shown in detail in FIG. 6; $V_{REF}$; preferably equal to +2 volts, shown in detail in FIG. 7) and an external –3 volt supply (supply voltage $V_{ee}$ provided at a voltage supply locus 252) to effectively operate within the level swing of a CMOS (complementary metal oxide silicon) device: +5 volts. Reference system 212 preferably sets a reference current $I_{REF}$ (not shown in detail in FIG. 6; shown in detail in FIG. 7) substantially equal to $$I_{REF} = \frac{I_W}{10} \qquad [1]$$

Where, $I_W$ is write current at write head ports 268, 272.

Reference system 212 operates as a current mirror to establish substantially equal currents in collectors 237, 241 for effecting switching operations and for presenting write current $I_W$ at write head ports 268, 272. First switch control system 208 responds to input signal WRITE DATA P being low by connecting emitter 240 with voltage supply locus 252. First switch control system 208 further responds to input signal WRITE DATA P being low by pulling down voltage at circuit locus 249 to a potential lower than the potential at circuit locus 251. Transistor 230 is not turned off but is maintained at a small current in order that impedance matching may be carried out differentially by impedance units 266, 270. When input signal WRITE DATA P is low input signal WRITE DATA N is high, and second switch control system 210 responds to input signal WRITE DATA N being high by disconnecting emitter 244 from voltage supply locus 252. Current flow is thereby established from transistor 238, through impedance unit 266, through write head port 268, through load 274, through write head port 272, through impedance unit 270 and through transistor 234 to supply voltage locus 246. Transistor 234 conducts because base 235 is at an appropriate voltage established by the voltage drop across resistor 250.

When input signal WRITE DATA P is high and input signal WRITE DATA N is low, second switch control system 210 responds to input signal WRITE DATA N being low (–3 volts) by connecting emitter 244 with voltage supply locus 252. Second switch control system 210 further responds to input signal WRITE DATA N being low by pulling down voltage at circuit locus 251 to a potential lower than the potential at circuit locus 249. Transistor 234 is not turned off but is maintained at a small current in order that impedance matching may be carried out differentially by impedance units 266, 270. When input signal WRITE DATA N is low input signal WRITE DATA P is high, and first switch control system 208 responds to input signal WRITE DATA P being high by disconnecting emitter 240 from voltage supply locus 252. Current flow is thereby established from transistor 242, through impedance unit 264, through write head port 272, through load 274, through write head port 268, through impedance unit 266 and through transistor 230 to supply voltage locus 246. Transistor 230 conducts because base 231 is at an appropriate voltage established by the voltage drop across resistor 248.

Boost low units 220, 224 are provided for bringing the low potential side of output signals at write head ports 268, 274 fast enough and far enough to assure fast and reliable data writing of low signals. When input signal WRITE DATA P switches from high to low, first boost low unit 220 applies a high and fast current pulse to circuit locus 249, thereby helping pull down potential at base 231 and the output signal at write head port 268. When input signal WRITE DATA N switches from high to low, second boost low unit 224 applies a high and fast current pulse to circuit locus 251, thereby helping pull down potential at base 235 and at write head port 272.

When input signal WRITE DATA P switches from high to low, input signal WRITE DATA N switches from low to high, and vice versa. Boost high units 222, 226 are provided for bringing the high potential side of output signals at write head ports 268, 274 fast enough and far enough to assure fast and reliable data writing of high signals. Boost high units 222, 226 operate simultaneously with boost low units 220, 224. Thus, when input signal WRITE DATA P switches from high to low, a pulse current is provided by input unit 214 to first boost high unit 222 to quickly connect base 235 with supply voltage locus 246 to pull up base 235 and write head port 272. When input signal WRITE DATA N switches from high to low, a pulse current is provided by input unit 216 to second boost high unit 226 to quickly connect base 231 with supply voltage locus 246 to pull up base 231 and write head port 268.

Apparatus 200 is a write driver that can be constructed to operate at speeds of 1 Gigabit per second with very low power consumption on the order of one-half the power consumption of prior art write drivers. Prior art write drivers apply boosting at write head ports 268, 272—relatively low impedance loci—thus requiring high currents and high power dissipation in carrying out boosting operations. Connection of boost systems 204, 206 to high impedance loci internal to apparatus 200 and removed from write head ports 268, 272 permits achievement of low current implementation of boosting operations. Low current implementation permits low power dissipation without sacrificing data rate.

Figure 7:
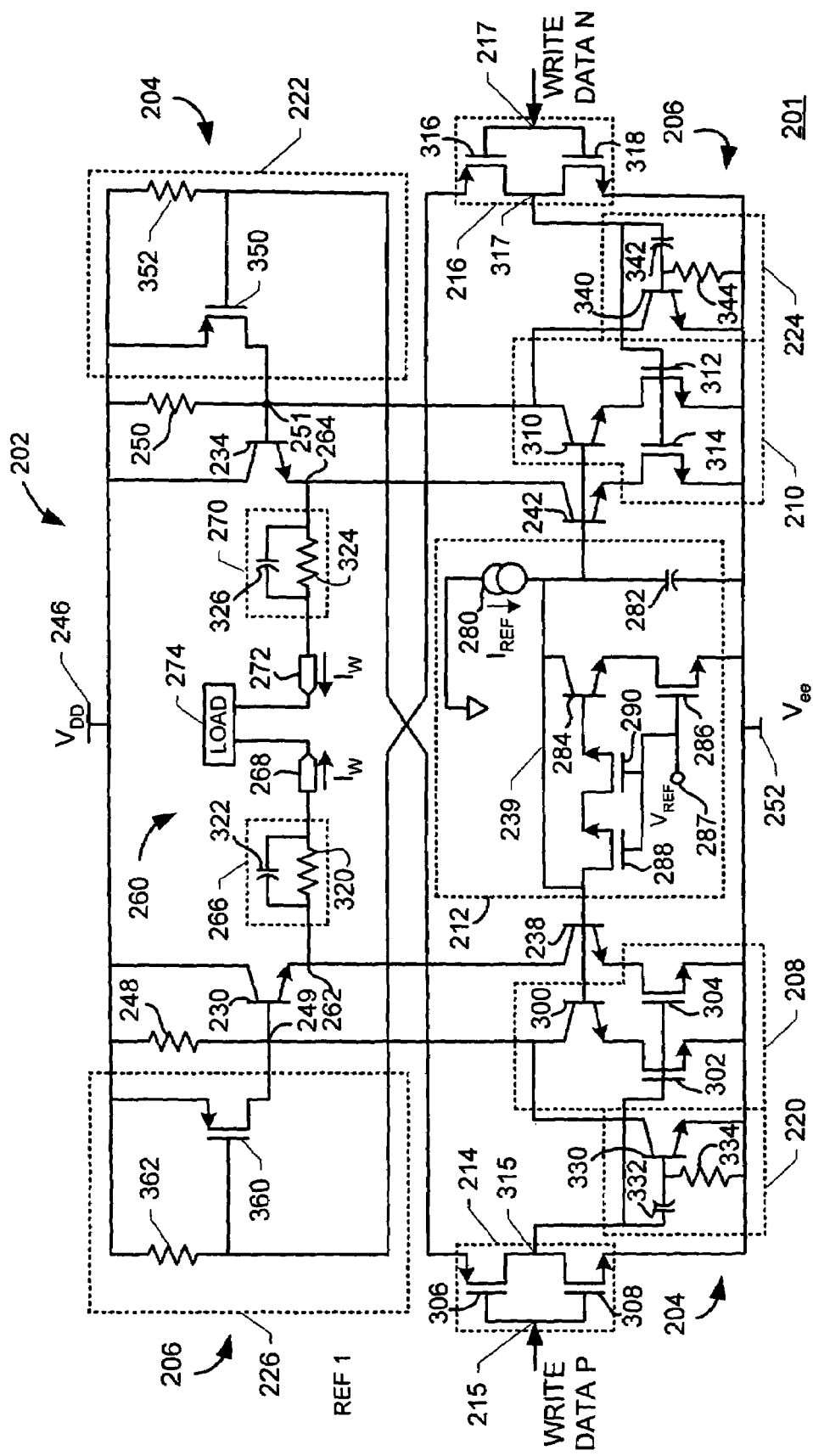
FIG. 7 is a simplified schematic diagram illustrating the preferred embodiment of the apparatus of the present invention.

FIG. 7 is a simplified schematic diagram illustrating the preferred embodiment of the apparatus of the present invention. In FIG. 7, a preamplifier apparatus 201 includes a current directing circuit or H-bridge circuit 202, a first boost system 204, a second boost system 206, a first switch control system 208, a second switch control system 210, a reference system 212 and input units 214, 216. First boost system 204 includes a first boost low unit 220 and a first boost high unit 222. Second boost system 206 includes a second boost low unit 224 and a second boost high unit 226.

H-bridge circuit 202 includes switching units embodied in bipolar transistors 230, 234, 238, 242. Transistors 230, 238 are coupled together and transistors 234, 242 are coupled together. Transistors 230, 234 are coupled with a supply voltage locus 246 at which a supply voltage $V_{DD}$ is provided. Preferably supply voltage $V_{DD}$ is +5 volts. Transistor 230 is coupled with second boost high unit 226. Transistor 234 is coupled with first boost high unit 222. Transistor 238 is coupled with voltage supply locus 252 via first switch control system 208. Transistor 242 is coupled with voltage supply locus 252 via second switch control system 210. Transistors 238, 242 are coupled with reference system 212.

Reference system 212 includes a current source 280 coupled with voltage supply locus 252 via a capacitor 282. A bipolar transistor 284 is diode coupled in series with an NMOS transistor 286 between current source 280 and voltage supply locus 252. Transistor 284 and NMOS transistor 286 are coupled in parallel with capacitor 282. NMOS transistors 288, 290 are coupled with the base of transistor 284 to provide β correction. A reference voltage $V_{REF}$ is applied to an input node 287 to keep NMOS transistors 286, 288, 290 continually on during a write operation and thereby provide proper bias potentials to the bases of transistors 238, 300, 242, 310. The bases of transistors 238, 300, 242, 310 are coupled in common via a line 239, and are thereby coupled with the collector of transistor 284 and coupled between current source 280 and capacitor 282.

Input unit 214 receives an input signal WRITE DATA P at an input locus 215. Input unit 214 is coupled with first switch control system 208, first boost low unit 220 and first boost high unit 222. Input unit 216 receives an input signal WRITE DATA N at an input locus 217. Input unit 216 is coupled with second switch control system 210, second boost low unit 224 and second boost high unit 226.

H-bridge circuit 202 further includes a data write system 260 coupled with a first connection locus 262 and a second connection locus 264. First connection locus 262 is located between and commonly connected with transistors 230, 238. Second connection locus 264 is located between and commonly connected with transistors 234, 242. Data write system 260 includes a first impedance matching unit 266 coupled with a first HWX write head port 268 and connection locus 262, and a second impedance matching unit 270 coupled with a second HWY write head port 272 and connection locus 264. First impedance matching unit 266 includes a resistor 320 coupled in parallel with a resistor 322. Second impedance matching unit 270 includes a resistor 324 coupled in parallel with a resistor 326

A load 274 is coupled between HWX write head port 268 and HWY write head port 272. Load 274 is preferably embodied in a thin film transducer coupled with write heads ports 268, 272 through a flex connection. Impedance matching units 266, 270 are used to match the impedance of the flex connection. Capacitors 322, 326 behave as a short at high frequencies in order to speed up transient current and voltage at write head ports 268, 272.

First switch control system 208 includes a bipolar transistor 300 in series with NMOS transistor 302 between circuit locus 249 and voltage supply locus 252. First switch control system 208 also includes NMOS transistor 304 coupled between bipolar transistor 238 and voltage supply locus 252. Input unit 214 includes PMOS transistor 306 and NMOS transistor 308 coupled with input locus 215 to operate as an inverter. NMOS transistors 302, 304 are coupled for gating with output 315 of input unit 214.

Second switch control system 210 includes a bipolar transistor 310 in series with NMOS transistor 312 between circuit locus 251 and voltage supply locus 252. Second switch control system 210 also includes NMOS transistor 314 coupled between bipolar transistor 242 and voltage supply locus 252. Input unit 216 includes PMOS transistor 316 and NMOS transistor 318 coupled with input locus 217 to operate as an inverter. NMOS transistors 312, 314 are coupled for gating with output 317 of input unit 216.

Preferably, input signals t input loci 215, 217 are operated from an internal +2 volts internal reference ($V_{REF}$) and an external −3 volt supply ($V_{ee}$) to effectively operate within the level swing of a CMOS (complementary metal oxide silicon) device: +5 volts. Reference system 212 preferably sets reference current $I_{REF}$ at current source 280 substantially equal to $$I_{REF} = \frac{I_W}{10} \quad [1]$$

Where, $I_w$ is write current at write head ports 268, 272.

When signal WRITE DATA P is low, NMOS transistors 302, 304 are switched on to connect transistors 238, 300 to voltage supply locus 252. Connecting transistor 300 to voltage supply locus 252 pulls down voltage at circuit locus 249 to a potential lower than the potential at circuit locus 251. Transistor 230 is not turned off but is maintained at a small current in order that impedance matching may be carried out differentially by impedance units 266, 270. When input signal WRITE DATA P is low input signal WRITE DATA N is high, and NMOS transistors 312, 314 are off, isolating transistors 242, 310 from voltage supply locus 252. Write current flow is thereby established from transistor 238, through impedance unit 266, through write head port 268, through load 274, through write head port 272, through impedance unit 270 and through transistor 234 to supply voltage locus 246. Transistor 234 conducts because its base is at an appropriate voltage established by the voltage drop across resistor 250.

When signal WRITE DATA N is low, NMOS transistors 312, 314 are switched on to connect transistors 242, 310 to voltage supply locus 252. Connecting transistor 310 to voltage supply locus 252 pulls down voltage at circuit locus 251 to a potential lower than the potential at circuit locus 249. Transistor 234 is not turned off but is maintained at a small current in order that impedance matching may be carried out differentially by impedance units 266, 270. When input signal WRITE DATA N is low input signal WRITE DATA P is high, and NMOS transistors 302, 304 are off, isolating transistors 238, 300 from voltage supply locus 252. Write current flow is thereby established from transistor 242, through impedance unit 270, through write head port 272, through load 274, through write head port 268, through impedance unit 266 and through transistor 230 to supply voltage locus 246. Transistor 230 conducts because its base is at an appropriate voltage established by the voltage drop across resistor 248.

Boost low units 220, 224 are provided for bringing the low potential side of output signals at write head ports 268, 274 fast enough and far enough to assure fast and reliable data writing of low signals. First boost low unit 220 includes a bipolar transistor 330 having its base coupled via a capacitor 332 with output 315 from input unit 214. The base of transistor 330 is also coupled through resistor 334 with voltage supply locus 252. The collector of transistor 330 is coupled with the collector of transistor 300. When input signal WRITE DATA P switches from high to low, a capacitive transient voltage is created at the base of transistor 330 through capacitor 332. This capacitive transient voltage produces a very high and fast current pulse out of the collector of transistor 300 which helps pulling down voltage at circuit locus 249 and the voltage level at write head port 268.

Second boost low unit 224 includes a bipolar transistor 340 having its base coupled via a capacitor 342 with output 317 from input unit 216. The base of transistor 340 is also coupled through resistor 344 with voltage supply locus 252. The collector of transistor 340 is coupled with the collector of transistor 310. When input signal WRITE DATA N switches from high to low, a capacitive transient voltage is created at the base of transistor 340 through capacitor 342. This capacitive transient voltage produces a very high and fast current pulse out of the collector of transistor 310 which helps pulling down voltage at circuit locus 251 and the voltage level at write head port 272.

Figure 8:
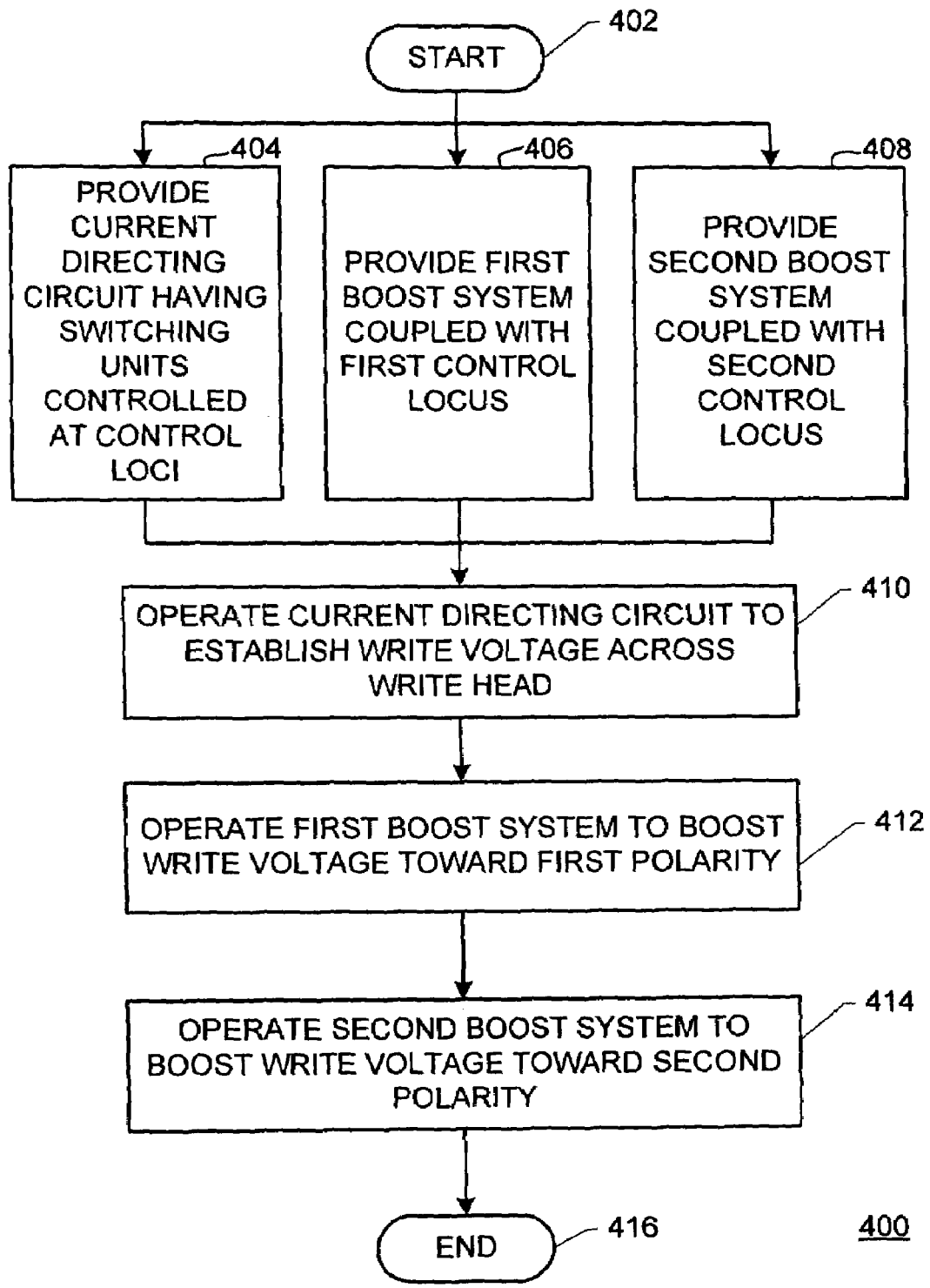
FIG. 8 is a flow chart illustrating the method for driving a write head according to the present invention.

FIG. 8 is a flow chart illustrating the method for driving a write head according to the present invention. In FIG. 8, a method 400 for applying write signals, including a first write signal and a second write signal, for driving a write head to effect writing information to a memory device begins at a START locus 402. Method 400 continues with the step of, in no particular order: (1) Providing a current directing circuit for receiving the write signals, as indicated by a block 404. The current directing circuit includes a first write locus and a second write locus. The first write locus is coupled with a supply source via an adjacent first impedance unit and a first switching unit. The second write locus is coupled with the supply source via an adjacent second impedance unit and a second switching unit. The first switching unit is controlled at a first control locus by the first write signal. The second switching unit is controlled at a second control locus by the second write signal. (2) Providing a first boost system coupled with the first control locus, as indicated by a block 406. (3) Providing a second boost system coupled with the second control locus, as indicated by a block 408.

Method 400 continues with the step of operating the current directing circuit to direct a write current to establish a write voltage between the first write locus and the second write locus across the write head in a first excursion toward a first polarity in response to the first write signal and to direct the write current to establish the write voltage across the write head in a second excursion toward a second polarity substantially opposite the first polarity in response to the second write signal, as indicated by a block 410.

Method 400 continues with the step of operating the first boost system to boost the write voltage toward the first polarity during the first excursion, as indicated by a block 412.

Method 400 continues with the step of operating the second boost system to boost the write voltage toward the second polarity during the second excursion, as indicated by a block 414. Method 400 terminates at an END locus 416.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

We claim:

1. An apparatus for use in applying write signals for driving a write head to effect writing information to a memory device; said write signals including a first write signal and a second write signal; the apparatus comprising:

(a) a current directing circuit; said current directing circuit receiving said write signals; said current directing circuit directing a write current to establish a write voltage between a first write locus and a second write locus across said write head in a first excursion toward a first polarity in response to said first write signal and directing said write current to establish said write voltage across said write head in a second excursion toward a second polarity substantially opposite said first polarity in response to said second write signal; said first write locus being coupled with a supply locus via an adjacent first impedance unit and a first switching unit; said second write locus being coupled with said supply locus via an adjacent second impedance unit and a second switching unit; said first switching unit being controlled at a first control locus by said first write signal; said second switching unit being controlled at a second control locus by said second write signal;

(b) a first boost system coupled with said first control locus and said second control locus; said first boost system boosting said write voltage toward said first polarity during said first excursion; and (c) a second boost system coupled with said first control locus and said second control locus; said second boost system boosting said write voltage toward said second polarity during said second excursion.

2. An apparatus for use in applying write signals for driving a write head to effect writing information to a memory device as recited in claim 1 wherein said first boost system lowers voltage at said first control locus and raises voltage at said second control locus in response to one write signal of said first write signal and said second write signal, and wherein said second boost system lowers voltage at said second control locus and raises voltage at said first control locus in response to the other write signal of said first write signal and said second write signal than said one write signal.

3. An apparatus for use in applying write signals for driving a write head to effect writing information to a memory device as recited in claim 1 wherein said first switching unit is a first bipolar transistor and said first control locus is the base of said first bipolar transistor, and wherein said second switching unit is a second bipolar transistor and said second control locus is the base of said second bipolar transistor.

4. An apparatus for use in applying write signals for driving a write head to effect writing information to a memory device as recited in claim 2 wherein said first switching unit is a first bipolar transistor and said first control locus is the base of said first bipolar transistor, and wherein said second switching unit is a second bipolar transistor and said second control locus is the base of said second bipolar transistor.

5. An apparatus for delivering write signals to a write head to effect writing information to a memory device; said write signals establishing a voltage between a first locus and a second locus across said write head and including a first write signal and a second write signal; the apparatus comprising:

(a) a responsive circuit coupled between an upper potential and a lower potential;

said responsive circuit receiving said write signals; said responsive circuit establishing a first potential between a first write locus and a second write locus across said write head in response to said first write signal and establishing a second potential across said write head in response to said second write signal;

said first write locus being coupled with a supply voltage source via an adjacent first impedance unit and a first switching unit; said second write locus being coupled with said supply voltage source via an adjacent second impedance unit and a second switching unit; said first switching unit being controlled at a first control locus by said first write signal; said second switching unit being controlled at a second control locus by said second write signal;

(b) a first boost system coupled with said first control locus and said second control locus; said first boost system boosting said first potential toward said upper potential to facilitate said responsive circuit achieving said first potential across said write head; and (c) a second boost system coupled with said first control locus and said second control locus; said second boost system boosting said second potential toward said lower potential to facilitate said responsive circuit achieving said second potential across said write head.

6. An apparatus for delivering write signals to a write head to effect writing information to a memory device as recited in claim 5 wherein said first boost system lowers voltage at said first control locus and raises voltage at said second control locus in response to one write signal of said first write signal and said second write signal, and wherein said second boost system lowers voltage at said second control locus and raises voltage at said first control locus in response to the other write signal of said first write signal and said second write signal than said one write signal.

7. An apparatus for delivering write signals to a write head to effect writing information to a memory device as recited in claim 5 wherein said first switching unit is a first bipolar transistor and said first control locus is the base of said first bipolar transistor, and wherein said second switching unit is a second bipolar transistor and said second control locus is the base of said second bipolar transistor.

8. An apparatus for delivering write signals to a write head to effect writing information to a memory device as recited in claim 6 wherein said first switching unit is a first bipolar transistor and said first control locus is the base of said first bipolar transistor, and wherein said second switching unit is a second bipolar transistor and said second control locus is the base of said second bipolar transistor.

9. A method for applying write signals for driving a write head to effect writing information to a memory device; said write signals including a first write signal and a second write signal; the method comprising the steps of:

(a) in no particular order:

(1) providing a current directing circuit; said current directing circuit receiving said write signals; said current directing circuit including a first write locus and a second write locus; said first write locus being coupled with a supply source via an adjacent first impedance unit and a first switching unit; said second write locus being coupled with said supply source via an adjacent second impedance unit and a second switching unit; said first switching unit being controlled at a first control locus by said first write signal; said second switching unit being controlled at a second control locus by said second write signal;

(2) providing a first boost system coupled with said first control locus; and (3) providing a second boost system coupled with said second control locus;

(b) operating said current directing circuit to direct a write current to establish a write voltage between said first write locus and said second write locus across said write head in a first excursion toward a first polarity in response to said first write signal and to direct said write current to establish said write voltage across said write head in a second excursion toward a second polarity substantially opposite said first polarity in response to said second write signal;

(c) operating said first boost system to boost said write voltage toward said first polarity during said first excursion; and (d) operating said second boost system to boost said write voltage toward said second polarity during said second excursion.

10. A method for applying write signals for driving a write head to effect writing information to a memory device as recited in claim 9 wherein said first boost system lowers voltage at said first control locus and raises voltage at said second control locus in response to one write signal of said first write signal and said second write signal, and wherein said second boost system lowers voltage at said second control locus and raises voltage at said first control locus in response to the other write signal of said first write signal and said second write signal than said one write signal.

11. A method for applying write signals for driving a write head to effect writing information to a memory device as recited in claim 9 wherein said first switching unit is a first bipolar transistor and said first control locus is the base of said first bipolar transistor, and wherein said second switching unit is a second bipolar transistor and said second control locus is the base of said second bipolar transistor.

12. A method for applying write signals for driving a write head to effect writing information to a memory device as recited in claim 10 wherein said first switching unit is a first bipolar transistor and said first control locus is the base of said first bipolar transistor, and wherein said second switching unit is a second bipolar transistor and said second control locus is the base of said second bipolar transistor.

* * * * *